(12) United States Patent
Liu

(10) Patent No.: US 11,755,461 B2
(45) Date of Patent: *Sep. 12, 2023

(54) ASYNCHRONOUS CONSUMER-DRIVEN CONTRACT TESTING IN MICRO SERVICE ARCHITECTURE

(71) Applicant: SAP SE, Walldorf (DE)

(72) Inventor: Yingqiao Liu, Shanghai (CN)

(73) Assignee: SAP SE, Walldorf (DE)

( * ) Notice: Subject to any disclaimer, the term of this patent is extended or adjusted under 35 U.S.C. 154(b) by 45 days.

This patent is subject to a terminal disclaimer.

(21) Appl. No.: 17/381,919

(22) Filed: Jul. 21, 2021

(65) Prior Publication Data

US 2021/0349810 A1 Nov. 11, 2021

Related U.S. Application Data

(63) Continuation of application No. 16/898,271, filed on Jun. 10, 2020, now Pat. No. 11,086,763, which is a
(Continued)

(51) Int. Cl.
*G06F 11/36* (2006.01)
*H04L 9/40* (2022.01)
(Continued)

(52) U.S. Cl.
CPC .......... *G06F 11/3672* (2013.01); *G06F 9/546* (2013.01); *H04L 63/123* (2013.01);
(Continued)

(58) Field of Classification Search
CPC ................. G06F 11/3672; G06F 9/546; G06F 2209/548; H04L 67/55; H04L 67/34; H04L 63/123

See application file for complete search history.

(56) References Cited

U.S. PATENT DOCUMENTS 6,606,660 B1 8/2003 Bowman-Amuah
6,850,979 B1 2/2005 Saulpaugh et al.
(Continued)

FOREIGN PATENT DOCUMENTS

CN 101151934 A * 3/2008 .......... H04W 76/002
CN 101197727 A * 6/2008 ............. H04L 51/38
(Continued)

OTHER PUBLICATIONS

Bakshi, "Microservices-Based Software Architecture and Approaches", 2017, IEEE (Year: 2017).*

(Continued)

*Primary Examiner* — Wei Y Zhen
*Assistant Examiner* — Junchun Wu
(74) *Attorney, Agent, or Firm* — SCHWEGMAN LUNDBERG & WOESSNER, P.A.

(57) ABSTRACT

A method of verifying, during a continuous integration (CI) and continuous delivery (CD) process, that an asynchronous message contract between a consumer service and a provider service in a microservice architecture has not been broken by a change to the provider service is disclosed. The asynchronous message contract is retrieved from a central server. A test message queue is created, the test message queue being separate from an existing message queue. Generation of a message based on a precondition specified in the asynchronous message contract is triggered. The message is retrieved from the test queue. The message is verified according to the asynchronous message contract, the verifying based on a build error not being generated during the CI and CD process.

20 Claims, 14 Drawing Sheets

Related U.S. Application Data continuation of application No. 16/202,901, filed on Nov. 28, 2018, now Pat. No. 10,698,798.

(51) Int. Cl.

| | | |
|---|---|---|
| *H04L 67/00* | (2022.01) | |
| *G06F 9/54* | (2006.01) | |
| *H04L 67/55* | (2022.01) | |

(52) U.S. Cl.
CPC .............. *H04L 67/34* (2013.01); *H04L 67/55* (2022.05); *G06F 2209/548* (2013.01)

(56) References Cited

U.S. PATENT DOCUMENTS

| | | | | |
|---|---|---|---|---|
| 7,716,492 | B1* | 5/2010 | Saulpaugh | G06Q 30/06 |
| | | | | 713/168 |
| 7,788,674 | B1 | 8/2010 | Siegenfeld | |
| 9,204,240 | B2* | 12/2015 | Musfeldt | H04L 67/565 |
| 9,479,517 | B2 | 10/2016 | Anand et al. | |
| 10,698,798 | B2 | 6/2020 | Liu | |
| 10,761,913 | B2 | 9/2020 | Mcclory et al. | |
| 10,956,918 | B1* | 3/2021 | Creedon | G06Q 30/0201 |
| 11,086,763 | B2* | 8/2021 | Liu | H04L 63/123 |
| 11,588,653 | B2* | 2/2023 | Wang | H04L 63/10 |
| 11,611,537 | B1* | 3/2023 | Hunt | H04L 63/0428 |
| 2003/0206192 | A1* | 11/2003 | Chen | H04L 67/51 |
| | | | | 715/733 |
| 2004/0267934 | A1 | 12/2004 | Patiejunas | |
| 2005/0080819 | A1 | 4/2005 | Russell | |
| 2006/0155894 | A1 | 7/2006 | Pennington | |
| 2008/0104258 | A1 | 5/2008 | Oneill et al. | |
| 2012/0221894 | A1* | 8/2012 | Zhao | G01R 31/31919 |
| | | | | 714/E11.17 |
| 2012/0265915 | A1 | 10/2012 | Goldstein et al. | |
| 2013/0160064 | A1* | 6/2013 | van Rozen | H04N 21/43615 |
| | | | | 725/110 |
| 2016/0021181 | A1 | 1/2016 | Ianakiev et al. | |
| 2018/0020008 | A1* | 1/2018 | Schoof | H04L 63/0876 |
| 2018/0314407 | A1* | 11/2018 | Dinh | H04L 51/226 |
| 2019/0089809 | A1* | 3/2019 | Theebaprakasam | G06F 9/542 |
| 2019/0149604 | A1 | 5/2019 | Jahr | |
| 2019/0155597 | A1* | 5/2019 | Lander | G06F 11/3688 |
| 2019/0317776 | A1* | 10/2019 | Walsh | H04L 41/0803 |
| 2020/0167267 | A1* | 5/2020 | Liu | H04L 67/34 |
| 2020/0334131 | A1 | 10/2020 | Liu | |
| 2022/0279004 | A1* | 9/2022 | Erlingsson | G06F 16/9535 |

FOREIGN PATENT DOCUMENTS

| | | | | |
|---|---|---|---|---|
| CN | 102364921 | A * | 2/2012 | |
| WO | WO-2009114559 | A1 * | 9/2009 | G03B 21/006 |

OTHER PUBLICATIONS

Betin-Can et al., "Modular Verification of Asynchronous Service Interactions Using Behavioral Interfaces", Aug. 2011, IEEE (Year: 2011).*

Aalst et al., "Multiparty Contracts: Agreeing and Implementing Interorganizational Processes", 2010, The computer Journal, vol. 53, No. 1 (Year: 2010).*

Ferrer-Gomila et al., "Optimality in Asynchronous Contract Signing Protocols", 2004, Springer-Verlag Berlin Heidelberg (Year: 2004).*

"U.S. Appl. No. 16/202,901, Notice of Allowance dated Feb. 20, 2020".

"U.S. Appl. No. 16/898,271, Corrected Preliminary Amendment filed Jul. 14, 2020", 6 pgs.

"U.S. Appl. No. 16/898,271, Non Final Office Action dated Dec. 10, 2020", 14 pgs.

"U.S. Appl. No. 16/898,271, Notice of Allowance dated Apr. 6, 2021", 10 pgs.

"U.S. Appl. No. 16/898,271, Preliminary Amendment filed Jul. 10, 2020", 6 pgs.

"U.S. Appl. No. 16/898,271, Response filed Mar. 9, 2021 to Non Final Office Action dated Dec. 10, 2020", 9 pgs.

Cien, Lianping, et al., "Microservices: Architecting for Continuous Delivery and DevOps", (2018), 8 pgs.

Emmerich, Wofgang, "Software Engineering and Middleware: A Roadmap", (2000), 12 pgs.

Flieder, "Testing and Visualizing a Message Gueuing Infrastructure", University of Applied Sciences, Graz, (2005), 7 pgs.

Pham, "Building Continuous Delivery Pipeline for Microservices", Helsinki Metropolia University of Applied Sciences, (May 2018), 68 pgs.

Wamboko, "Development of a Scalable Microservice Architecture for Web Services using OS-level Virtualization", University of Nairobi, (2016), 160 pgs.

\* cited by examiner

```
{
  "messages": [
    {
      "description": "message sent after a product create",
      "precondition": Product.Create
      "routing-key": Product.Create.#
      "contents": {
        "code": "productCode226388"
        ...
      },
      "matchingRules": {
        "$.body.code": {
          "match": "type"
        },
          ...
      }
    },
    ...
  ],
}
```

FIG. 5

```java
package au.com.dius.pact.provider.junit;

import java.util.Collections;

@RunWith(PactRunner.class)
@Provider("product-async")
@PactFolder("/opt/pact")
public class PactMessageTest {
  @TestTarget
  public final Target target = new AmqpTarget(Collections.singletonList("au.com.dius.pact.provider.junit.*"));

@PactVerifyProvider("Create product")
  public String verifyMessageForOrder() {
    String msg = System.getenv("PACTMESSAGE_CREATE");
    return msg;
  }
}
```

*FIG. 9*

```
FROM hyper.cd/sapjvm/jmeter:3.1-test
COPY / /opt/
RUN cp /opt/lib/*.jar /opt/jmeter/lib/
RUN cp /opt/lib/ext/*.jar /opt/jmeter/lib/ext/
RUN mkdir /opt/pact && cp /opt/app/src/main/resources/message.json /opt/pact/
RUN cd /opt/ &&\
    chmod +x *.sh
RUN cd /opt/app/target/appassembler/bin/ && chmod +x app
ENTRYPOINT ["/opt/run.sh"]
```

*FIG. 11*

ASYNCHRONOUS CONSUMER-DRIVEN CONTRACT TESTING IN MICRO SERVICE ARCHITECTURE

CROSS-REFERENCE TO RELATED APPLICATIONS

This application is a continuation of prior application Ser. No. 16/898,271, filed on Jun. 10, 2020, which is a continuation of prior application Ser. No. 16/202,901, filed on Nov. 28, 2018, which applications are incorporated by reference herein in their entirety.

TECHNICAL FIELD

The present disclosure generally relates to automated testing of software and, in one specific example, to testing services in a microservice architecture having a consumer-driven contract pattern.

BACKGROUND

Microservice architecture (MSA) has become more and more popular in the information technology (IT) industry (e.g., as a feature of cloud native applications). MSA brings some advantages, such as easy deployment, automatic scaling, service resilience, and so on. But it also brings some challenges. For example, in a traditional software development process, such as one involving a monolithic architecture, integration testing is an important phase to ensure software quality. But, in MSA, integration testing has some problems, including being slow, easy to break, hard to fix, and so on.

Consumer-driven contract (CDC) testing is an option for replacing integration testing in MSA. CDC testing in MSA may be separated into two categories. One category is for synchronous communications, such as for services using Hypertext Transfer Protocol (HTTP) and Representational State Transfer (REST)ful APIs. Another is asynchronous communications, such as for services using Advanced Message Queuing Protocol (AMQP), which is supported in many cloud environments. Third-party CDC tools, such as Pact, may be used for testing synchronous message contracts. However, such third-party tools are often ineffective or inefficient for testing asynchronous message contracts. For example, third-party tools may merely run a unit test to get a result and then check the result against the message contract. For complex services, such as microservices running in a cloud-based enterprise resource planning (ERP) environment, third-party CDC testing tools typically generate and use fake code (e.g., test doubles); thus, their results may not match results from code deployed on a real system.

BRIEF DESCRIPTION OF THE DRAWINGS

FIG. 5 is pseudo-code listing of an example contract, in accordance with some example embodiments.

FIG. 9 is a pseudo-code listing of how a message may be verified using Pact, in accordance with some example embodiments.

FIG. 11 depicts a listing of a docker file that is invokable by the CI/CD pipeline to perform the verification, in accordance with some example embodiments.

DETAILED DESCRIPTION

In the following description, for purposes of explanation, numerous specific details are set forth in order to provide an understanding of example embodiments of the present subject matter. It will be evident, however, to those skilled in the art that example embodiments may be practiced without these specific details.

In example embodiments, a method of verifying, during a continuous integration (CI) and continuous delivery (CD) process, that an asynchronous message contract between a consumer service and a provider service in a microservice architecture has not been broken by a change to the provider service is disclosed. The asynchronous message contract is retrieved from a central server. A test message queue is created, the test message queue being separate from an existing message queue. Generation of a message based on a precondition specified in the asynchronous message contract is triggered. The message is retrieved from the test queue. The message is verified according to the asynchronous message contract, the verifying based on a build error not being generated during the CI and CD process.

This method and example embodiments disclosed herein may be implemented by a specially-configured computer system. The computer system may be specially configured by one or more modules (e.g., hardware modules or software modules) and implemented by one or more computer processors of the computer system. This method and example embodiments disclosed herein may be embodied as instructions stored on a machine-readable medium that, when executed by one or more processors of a computer system, cause the computer system to perform one or more of the operations described herein.

The details of one or more variations of the subject matter described herein are set forth in the accompanying drawings and the description below. Other features and advantages of the subject matter described herein will be apparent from the description and drawings, and from the claims.

Figure 1:
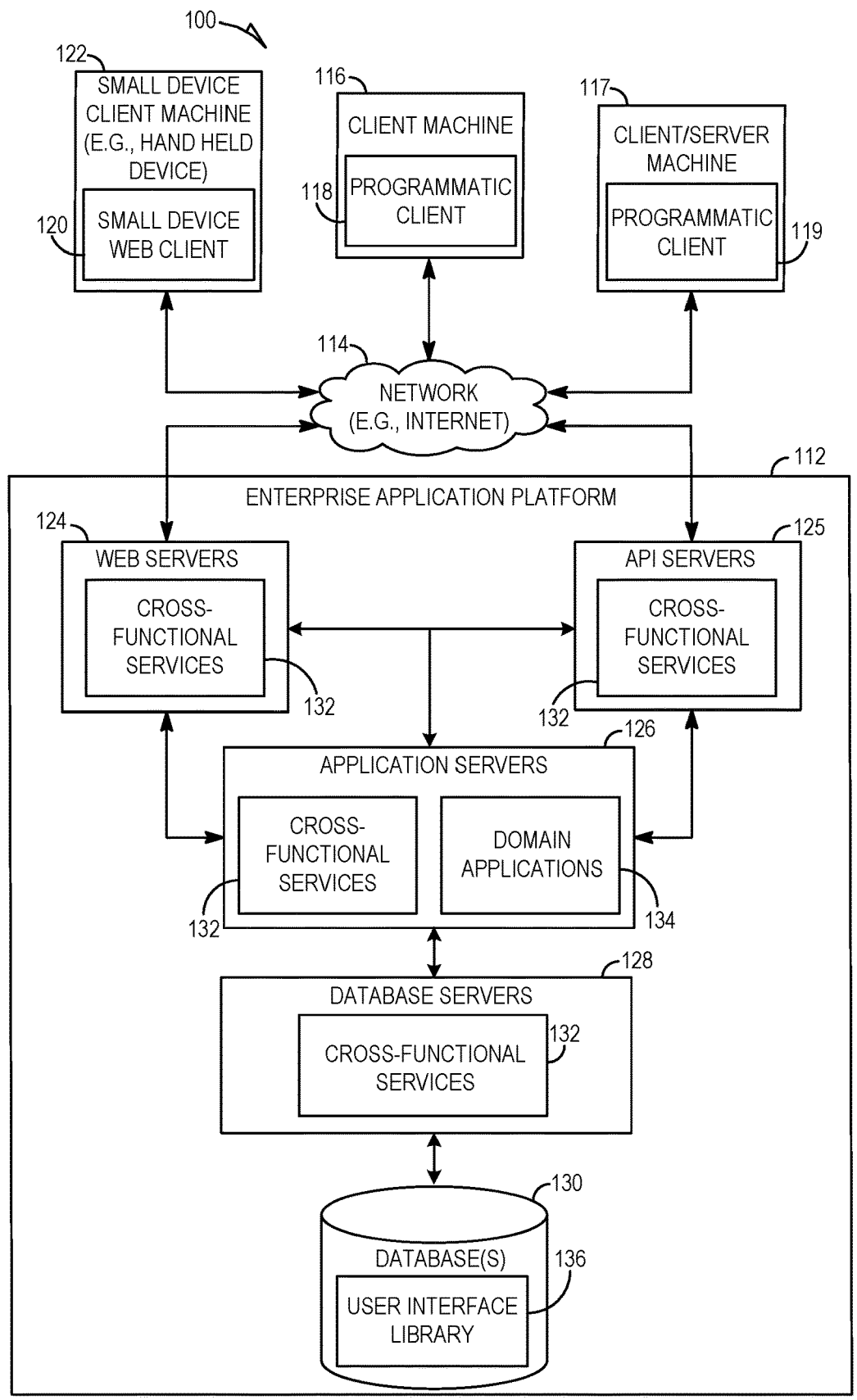
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
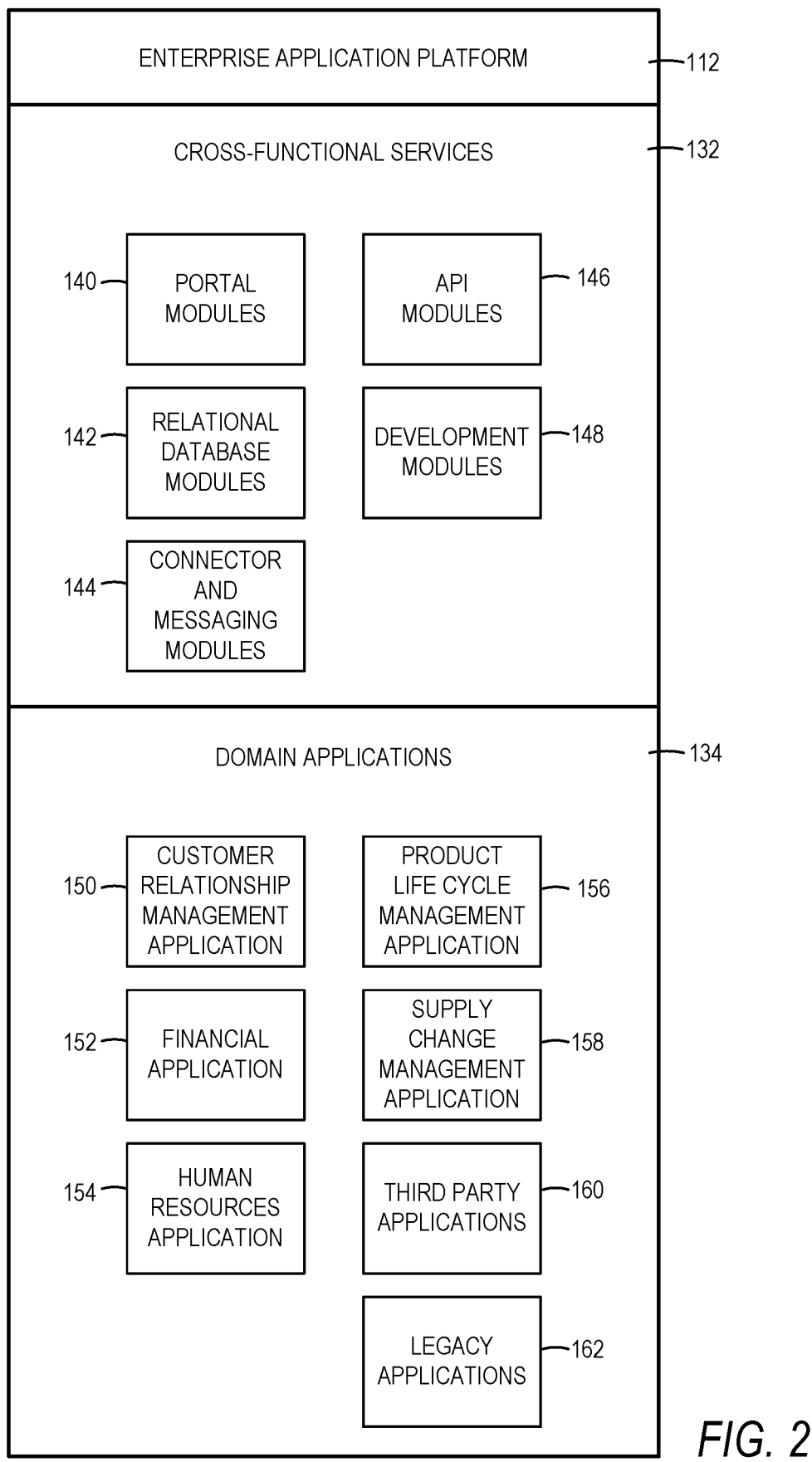
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
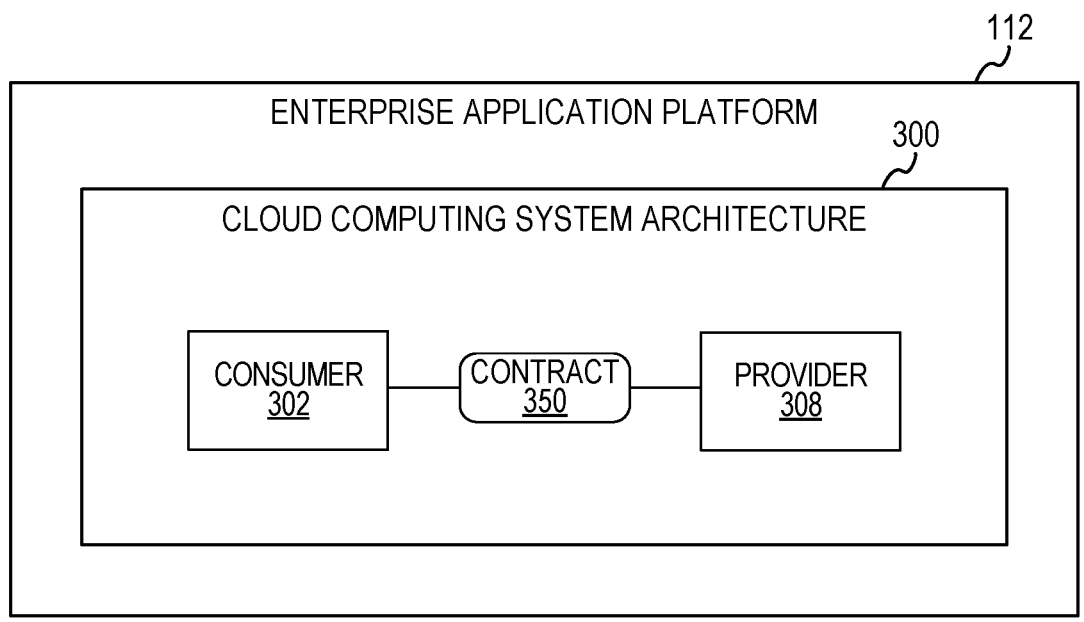
FIG. 3 is a relationship diagram depicting relationships between participants in a Consumer Driven Contract (CDC), in accordance with some example embodiments.

FIG. 3 is a relationship diagram depicting relationships between participants in a Consumer Driven Contract (CDC). In MSA, CDC has two participants. One is a consumer service provided by a provider 308; another is a consumer service provided by a consumer 302. Together, they form a contract 350. Therefore, the disclosed solution has two parts: one is on the consumer side and another is on the provider side. Consider the example of a product update. In this example, the provider side is a product service that manages product and SKU master data and pricing. The consumer side is a channel adapter service that needs to synchronize all product-related data to a font-end channel, such as an online store. In this case, the contract 350 is the following: when there is a product data change, the product service will send a message to the message queue with content of the change; then the consumer service (e.g., the channel adapter) will get this message and update local data accordingly. In this solution, the consumer service does at least two things: it defines the contract 350 and uploads the contract 350 to a central server.

Figure 4:
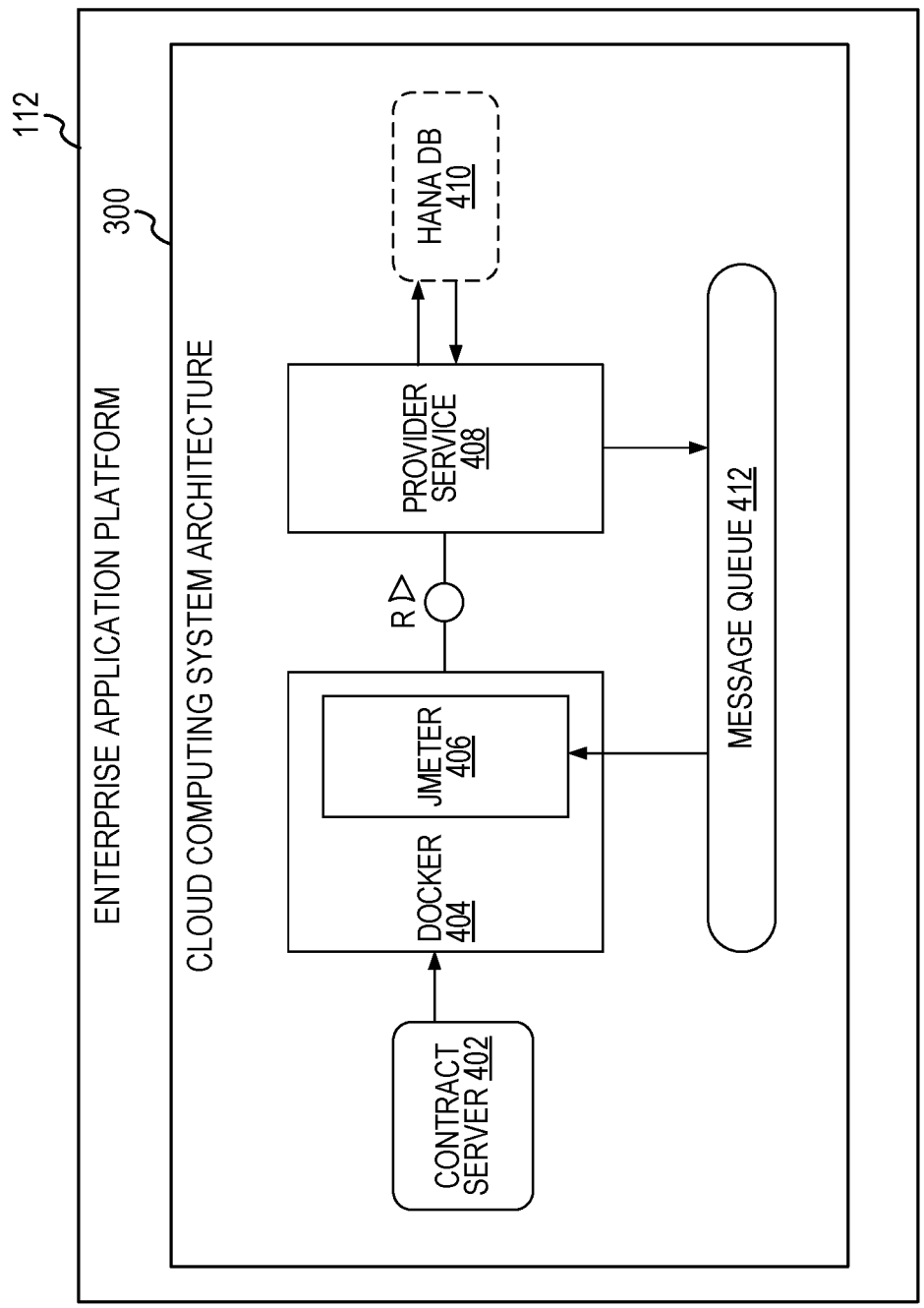
FIG. 4 is an example environment in which the various provider-side steps may be implemented.

FIG. 4 is an example environment in which the steps described herein may be implemented. A contract server 402 manages contracts established between a consumer service and a provider service. A docker 404 is a container in which steps and tools implemented and used on the provider side are placed. A provider service 408 communicates with a database 410 and a message queue 412 to allow for the verification of the message in the docker 404 using the provider-side steps described herein.

JMeter 406 may include a docker file, such as the file depicted in FIG. 11, which is invokable by the CI/CD pipeline to perform the message verification. In example embodiments, the verification is triggered when a change is identified in the provider source repository.

FIG. 5 is pseudo-code listing of an example contract. In some embodiments, the contract format can be any plain text format. For example, the contract format can be in JSON (JavaScript Object Notation) format, as needed for integration with one or more third party tools (e.g., Pact).

In cloud ERP under MSA, contracts pertaining to asynchronous messages may have one or more preconditions. In the product update example, when a product is created, updated, or deleted, the provider service will generate and transmit a message that describes this change. The receiver side will receive this message and propagate the related change to the front-end side. So, in this scenario, the contract between backend and frontend includes the following: when a product is created, then generate a product creation message. In this contract, "create product" is a precondition of the "product creation message."

In the pseudo-code listing, "messages" is an array of messages definition. "Precondition" is a precondition of message generated, which can be empty. In this example, when a product is created, a message having a defined contents list is generated. "Contents" specifies the message body contents. In example embodiments, it is not the full message content; instead, it is only a part of the message that interests the consumer. For example, if the consumer side only cares about unit of measurement (uom) related information, it is okay to only list uom information in the message content. "Matchingrules" are rules used to match types of values specified in the message (e.g., for compatibility with third party tools). For example, in some scenarios, the consumer service may not care about a specific value or property in the message; instead, it may only care about type of value or property.

Figure 6:
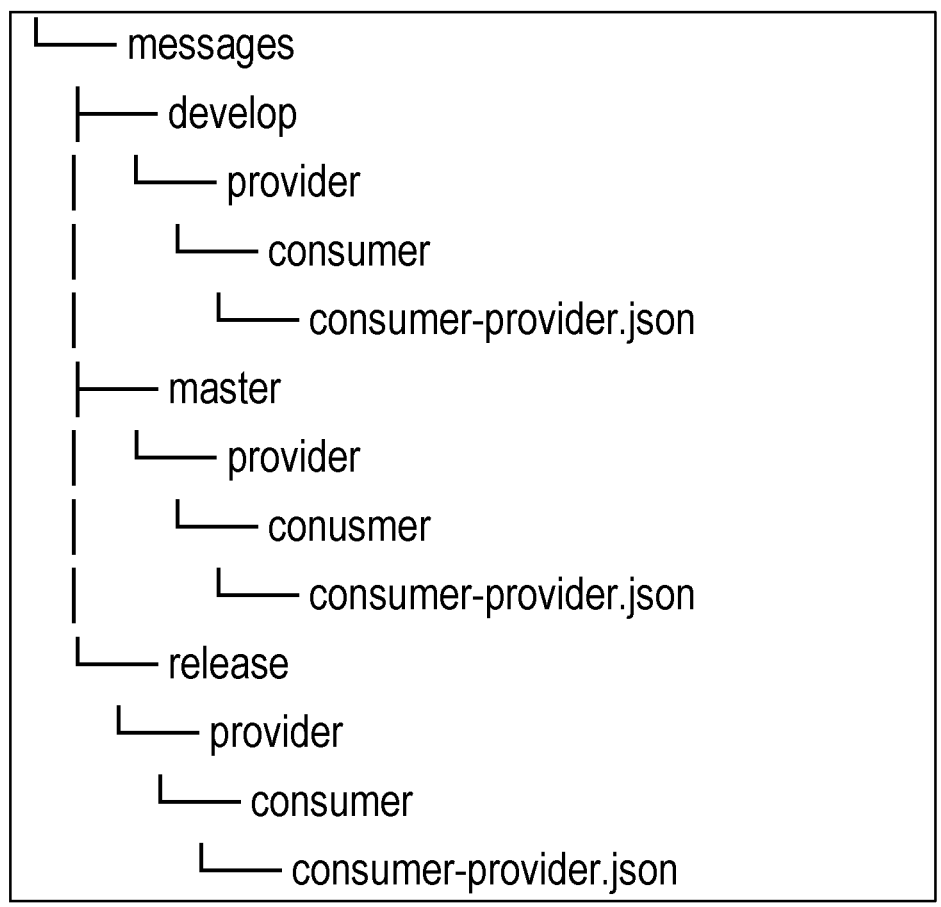
FIG. 6 is an example folder structure of a contract repository stored on a central server, in accordance with some example embodiments.

FIG. 6 is an example folder structure of a contract repository stored on a central server. In MSA, every service typically has its own git repository. However, a provider service can't get a contract from a consumer service git repository. In the disclosed solution, the consumer service defines contracts and pushes them to a central server. Thus, these contracts can be retrieved on the provider side from the central server and verified without accessing a consumer's source code repository.

From a development process view, there may be source code branches corresponding to different development phases. For example, a "develop" branch may represent a major development phase; a "release" branch may represent a stabilization phase; a "master" branch may represent an online phase; a "hotfix" branch may represent minor changes between major releases; a "feature" branch may represent feature development. Each different branch may be associated with a different contract. Branch information may be added to the central server.

Figure 7:
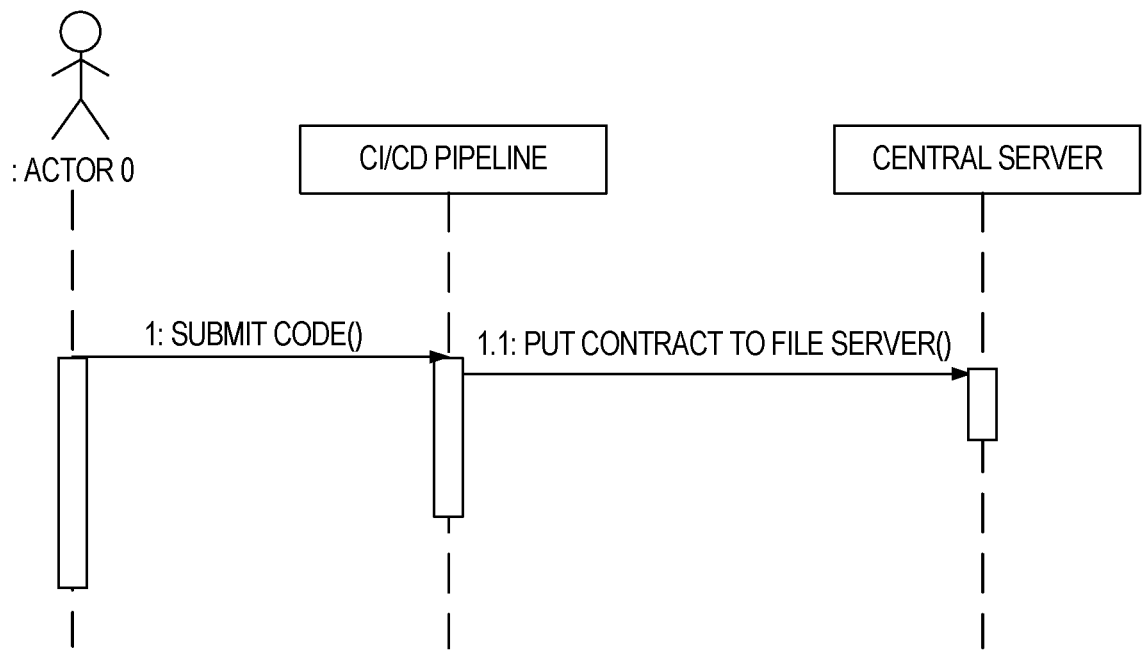
FIG. 7 is a flow chart depicting a source repository pipeline in which the disclosed solution is incorporated, in accordance with some example embodiments.

FIG. 7 is a flow chart depicting a source repository pipeline in which the disclosed solution is incorporated. An actor submits changed code. Once a change is submitted, it will trigger a CI/CD pipeline that will do compile, test, package, and deploy tasks. A CDC contract is placed into a consumer repository and uploaded to a central server in the CI/CD pipeline.

To verify an asynchronous message efficiently, the disclosed solution also involves performing one or more steps on the provider side. First, basic master data is prepared in a test tenant template. For example, a cloud ERP system may have two categories data. One is master data; another is for transaction data. Based on business domain logic, when a user does some transactions, such as, for example, creating a Sales Order, some predefined master data like product, customer, tax code, and so on, may be needed. That means that, in order to test a Sales Order related feature, many basic master data items may need to be prepared or created, which can be a time-consuming task.

To solve this issue, some template tenants are predefined. These template tenants may include some basic master data items, like product, customer, tax code, channel, and so on. Therefore, when testing is performed, tenant data may be restored from the predefined template, which prevents the need to create an empty tenant and then add basic data items one by one.

Second, a message contract may be retrieved from a central server. As discussed above, this message contract may be generated by a consumer service and placed on the central server (e.g., in one or more repository branches). The provider service will download the contract from the current branch's files, such as the branch corresponding to the current development state of interest.

Third, one or more new message queues are declared or created. These message queues are used instead of existing message queues in order to avoid affecting an origin system.

Figure 8:
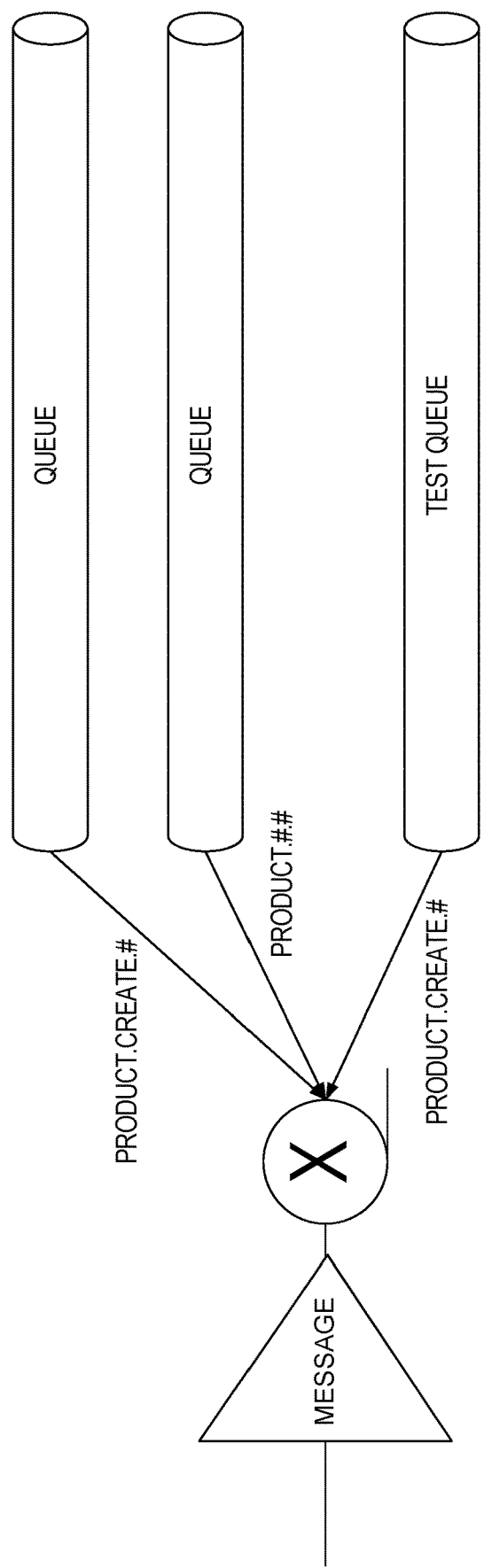
FIG. 8 depicts the creation of a test queue corresponding to a product creation message, in accordance with some example embodiments.

The routing key is defined in the message contract. In example embodiments, the message change queue is topic based, so a new queue can be added with the same routing key without affecting the original queue. FIG. 8 depicts the creation of a test queue corresponding to a product creation message.

Fourth, an API is called to generate an expected message. For example, in MSA, a message may be triggered when an event happens. This event may be an API call or another event. For example, to generate a production creation event, a product.create API may be called either by an end user or a batch import. The message contract may specify one or more property preconditions. Some precondition API calls such as product. create, product.update; SalesOrder.Create may be considered standard processes. For a simple case, if the message's precondition comes from these standard processes, the standard APIs are called directly. However, if these standard APIs can't satisfy a message's precondition, APIs may be written on demand.

Fifth, a message may be received from the previously-created message queue and stored in a local store (e.g., in an environment variable)

Sixth, the message may be verified based on the message contract. For example, a third-party tool or framework can do this check. For example, Pact may be used. As described above, a match rules section may be used to define the message such that it is compatible with such a third-party tool, allowing the third-party tool to be called directly to perform the verification.

FIG. 9 is a pseudo-code listing of how a message may be verified using Pact. In example embodiments, the "Create product" and "PACTMESSAGE_CREATE" elements in the pseudo-code are replaceable elements in dynamic test code generated and used in multiple test cases based on the message contract.

Figure 10:
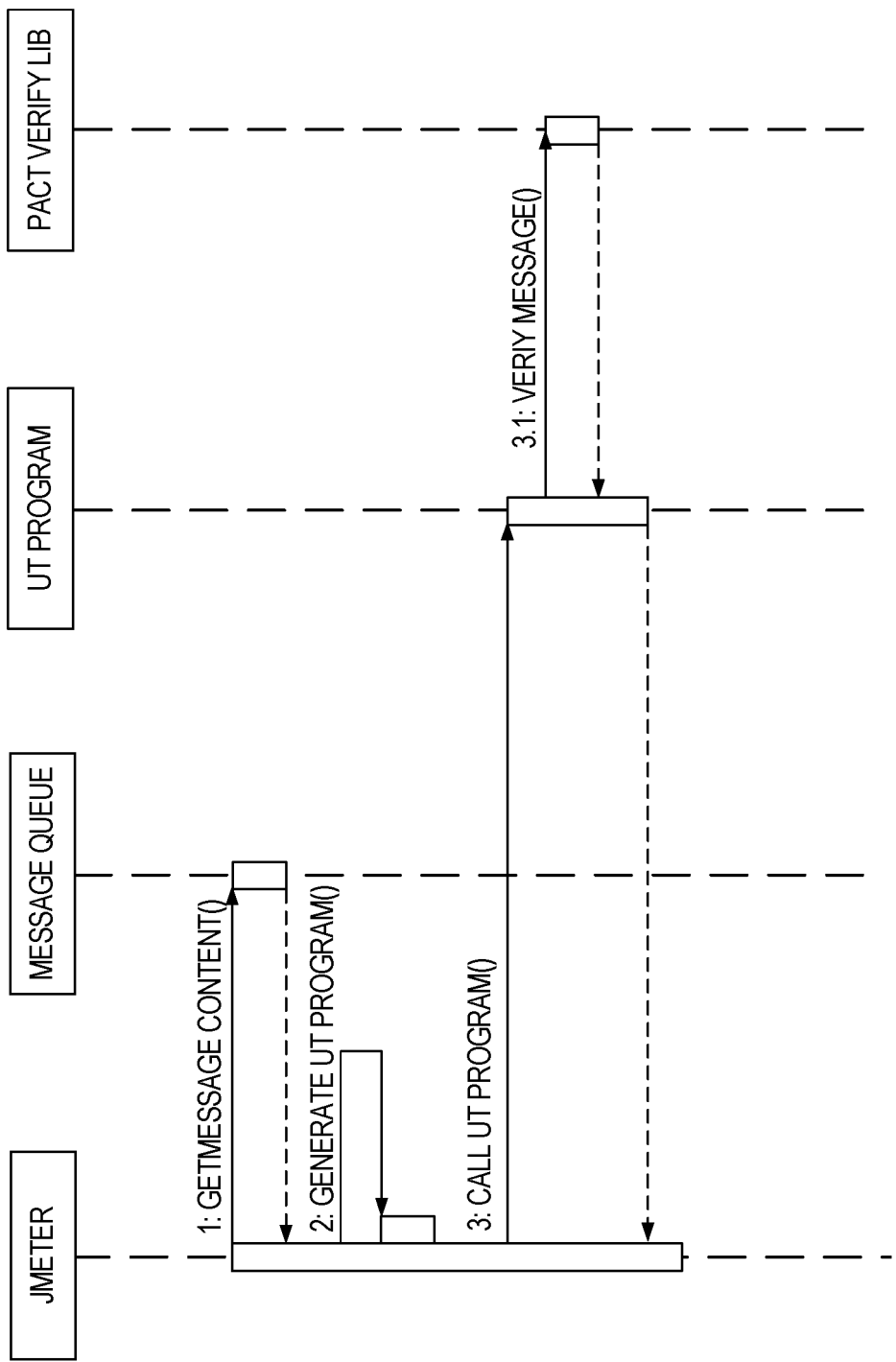
FIG. 10 is a flowchart depicting verification of a message, in accordance with some example embodiments.

FIG. 10 is a flowchart depicting verification of a message. The JMeter requests the message content from the message queue. The JMeter generates a unit testing (UT) program to test the message content. The JMeter calls the UT program, which in turn calls a third-party tool, such as Pact, to verify the message. The result of the verification is returned to the JMeter.

FIG. 11 depicts a listing of a docker file that is invokable by the CI/CD pipeline to perform the verification, in accordance with some example embodiments.

Figure 12:
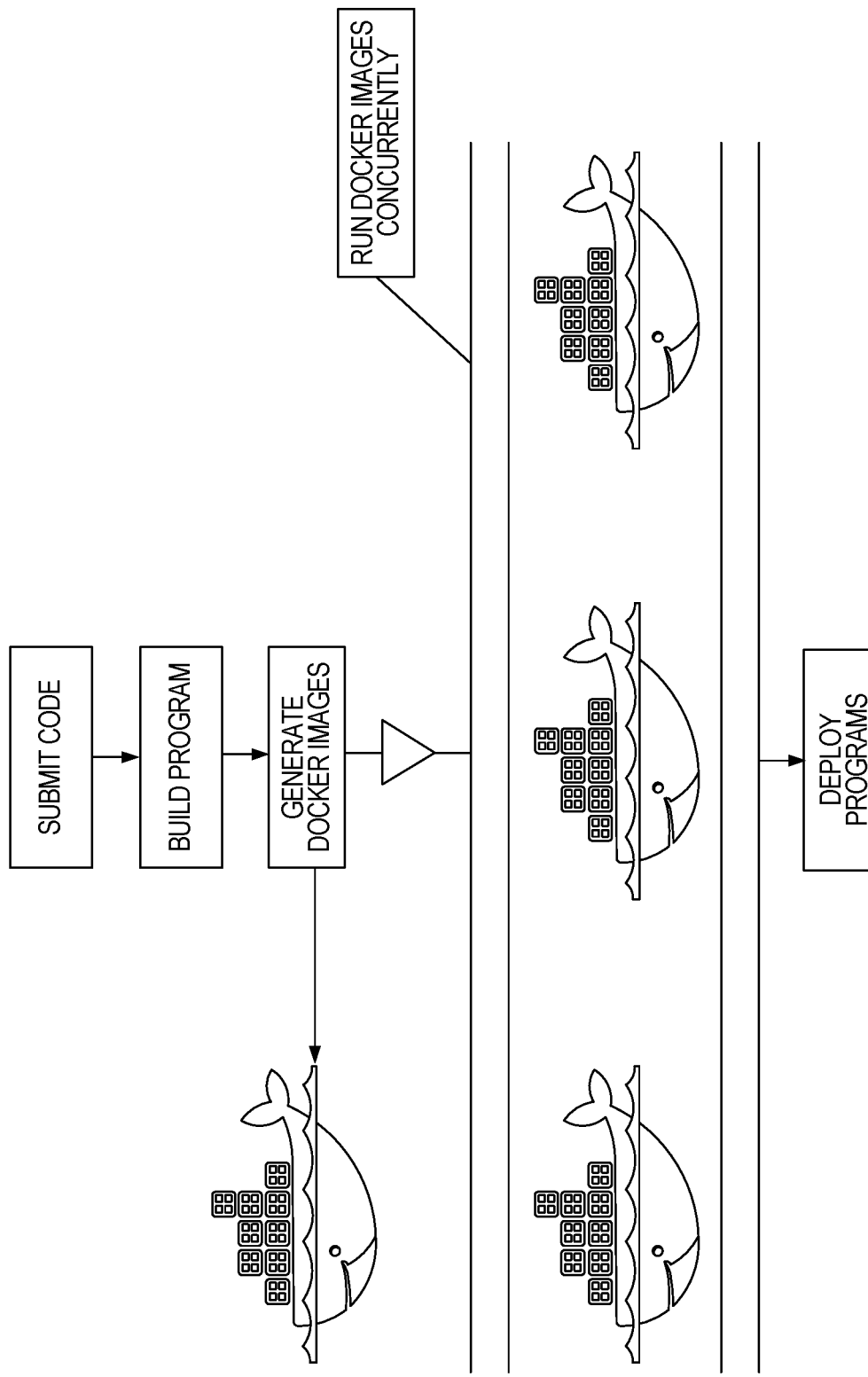
FIG. 12 depicts how the message verification functionality is integrated into the CI/CD pipeline, in accordance with some example embodiments.

FIG. 12 depicts how the message verification functionality is integrated into the CI/CD pipeline. Code is submitted. A program is built from the code. Docker images are generated and run concurrently. Programs are deployed. Changes in the source code may trigger message verification testing using tools that are invokable from within the docker containers.

Figure 13:
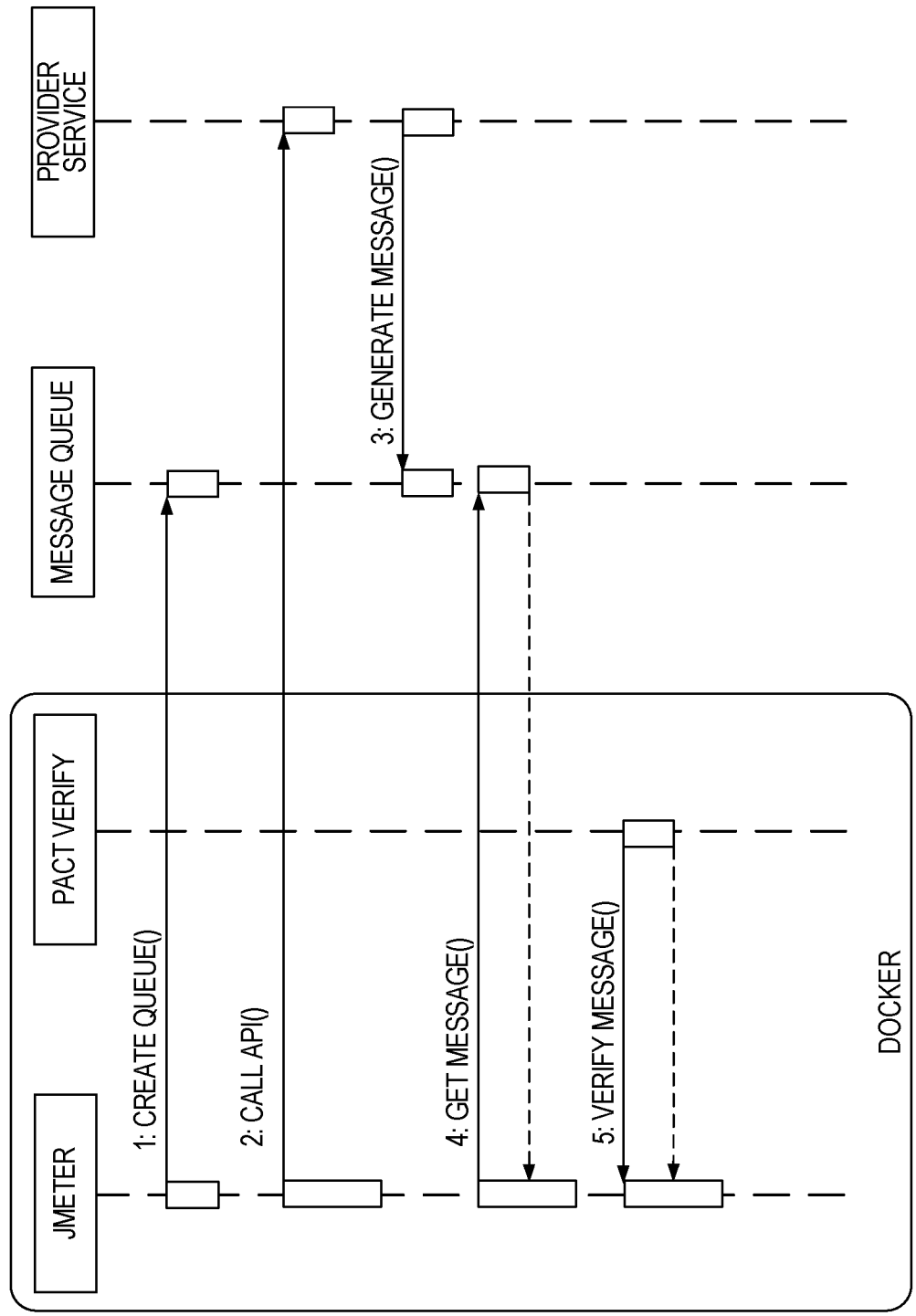
FIG. 13 is a flow diagram depicting the message verification process, in accordance with some example embodiments.

FIG. 13 is a flow diagram depicting the message verification process. The JMeter requests a creation of a test message queue. The test message queue is then created. The JMeter performs an action that causes a message to be generated (e.g., by calling an API at the provider service). The provider service generates a message and places it into the test message queue. The message is retrieved from the test message queue by the JMeter. The message is then verified by the JMeter (e.g., by using a third-party tool, such as Pact).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 14:
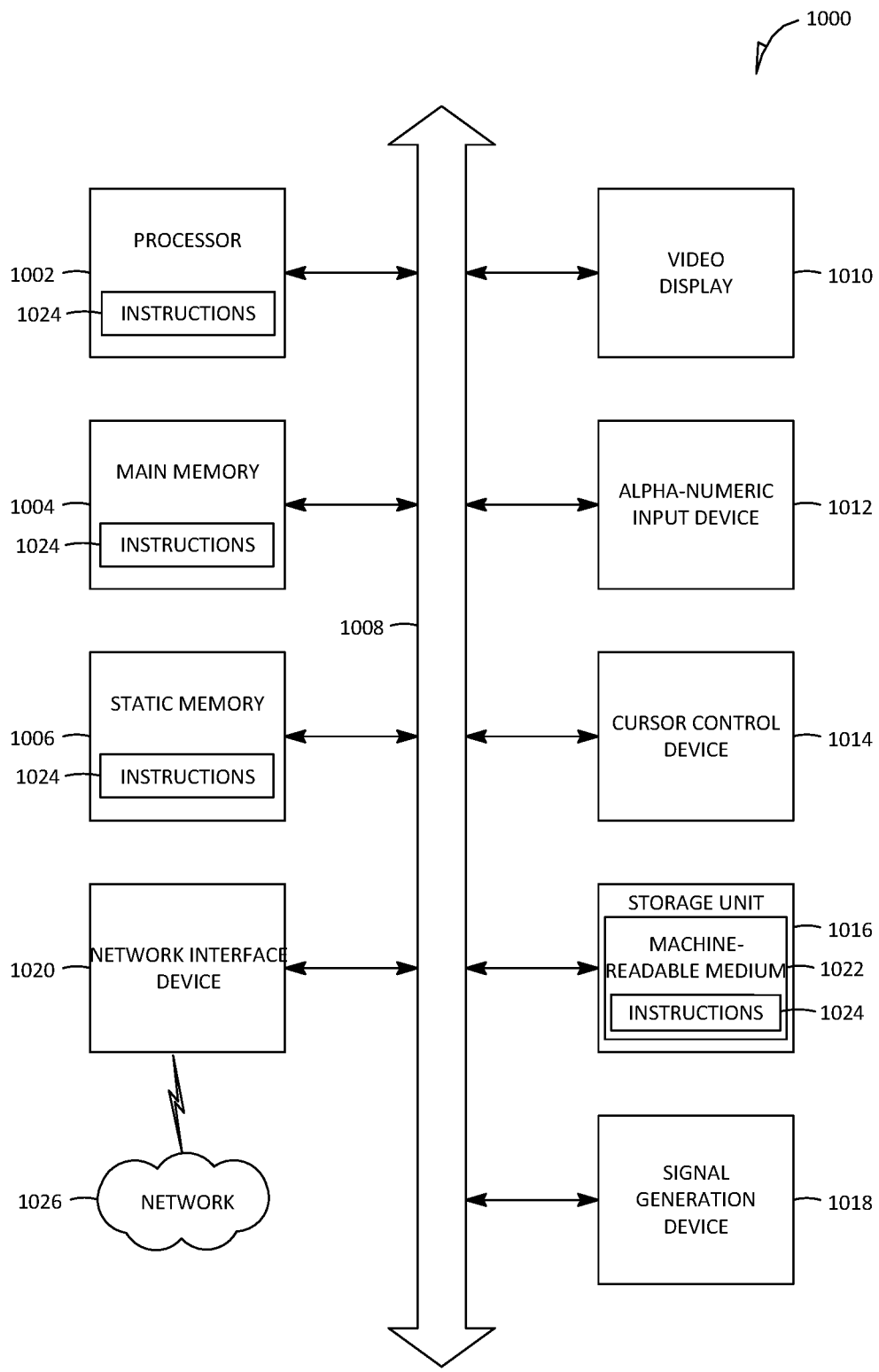
FIG. 14 is a block diagram of a machine in the example form of a computer system within which instructions for causing the machine to perform any one or more of the operations or methodologies discussed herein may be executed.

FIG. 14 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories; and
   a set of instructions incorporated into the one or more computer memories, the set of instructions configuring the one or more computer processors to perform operations comprising:
   retrieving an asynchronous message contract from a central server, the asynchronous message contract having been formed between a provider service and a consumer service and comprising one or more preconditions of messages sent in accordance with the asynchronous message contract;
   creating a test message queue, the test message queue being separate from an existing message queue;
   triggering generation of a message based on a precondition specified in the asynchronous message contract;
   getting the message from the test message queue; and
   verifying of the message according to the asynchronous message contract.

2. The system of claim 1, wherein the precondition includes calling a standard Application Program Interface (API) of a provider service and the triggering of the generation of the message includes performing the calling of the standard API.

3. The system of claim 1, wherein satisfaction of the precondition includes calling a non-standard API of a provider service and the triggering of the generation of the message includes writing the non-standard API on-demand and performing the calling of the non-standard API.

4. The system of claim 1, wherein the generation of the message includes restoring basic master data from a test tenant template corresponding to the message.

5. The system of claim 1, wherein the asynchronous message contract is pushed to the central server by the consumer service.

6. The system of claim 5, the operations further comprising selecting the asynchronous message contract based on a phase of a continuous integration (CI) and continuous delivery (CD) process into which the verifying of the message is integrated and a code branch into which the asynchronous message contract is stored on the central server.

7. The system of claim 6, wherein the verifying of the message is based on changes to source code using tools that are invokable from within one or more docker containers.

8. A method comprising:
   retrieving an asynchronous message contract from a central server, the asynchronous message contract having been formed between a provider service and a consumer service and comprising one or more preconditions of messages sent in accordance with the asynchronous message contract;
   creating a test message queue, the test message queue being separate from an existing message queue;
   triggering generation of a message based on a precondition specified in the asynchronous message contract;
   getting the message from the test message queue; and
   verifying of the message according to the asynchronous message contract.

9. The method of claim 8, wherein the precondition includes calling a standard Application Program Interface (API) of a provider service and the triggering of the generation of the message includes performing the calling of the standard API.

10. The method of claim 8, wherein satisfaction of the precondition includes calling a non-standard API of a provider service and the triggering of the generation of the message includes writing the non-standard API on-demand and performing the calling of the non-standard API.

11. The method of claim 8, wherein the generation of the message includes restoring basic master data from a test tenant template corresponding to the message.

12. The method of claim 8, wherein the asynchronous message contract is pushed to the central server by the consumer service.

13. The method of claim 12, further comprising selecting the asynchronous message contract based on a phase of a continuous integration (CI) and continuous delivery (CD) process into which the verifying of the message is integrated and a code branch into which the asynchronous message contract is stored on the central server.

14. The method of claim 13, wherein the verifying of the message is based on changes to source code using tools that are invokable from within one or more docker containers.

15. A non-transitory machine-readable storage medium including a set of instructions that, when executed by one or more computer processors, cause the one or more computer processors to perform operations comprising:
retrieving an asynchronous message contract from a central server, the asynchronous message contract having been formed between a provider service and a consumer service and comprising one or more preconditions of messages sent in accordance with the asynchronous message contract;
creating a test message queue, the test message queue being separate from an existing message queue;
triggering generation of a message based on a precondition specified in the asynchronous message contract;
getting the message from the test message queue; and
verifying of the message according to the asynchronous message contract.

16. The non-transitory machine-readable storage medium of claim 15, wherein the precondition includes calling a standard Application Program Interface (API) of a provider service and the triggering of the generation of the message includes performing the calling of the standard API.

17. The non-transitory machine-readable storage medium of claim 15, wherein satisfaction of the precondition includes calling a non-standard API of a provider service and the triggering of the generation of the message includes writing the non-standard API on-demand and performing the calling of the non-standard API.

18. The non-transitory machine-readable storage medium of claim 15, wherein the generation of the message includes restoring basic master data from a test tenant template corresponding to the message.

19. The non-transitory machine-readable storage medium of claim 15, wherein the asynchronous message contract is pushed to the central server by the consumer service.

20. The non-transitory machine-readable storage medium of claim 19, the operations further comprising selecting the asynchronous message contract based on a phase of a continuous integration (CI) and continuous delivery (CD) process into which the verifying of the message is integrated and a code branch into which the asynchronous message contract is stored on the central server.

* * * * *